(12) United States Patent
Chae et al.

(10) Patent No.: US 7,438,056 B2
(45) Date of Patent: Oct. 21, 2008

(54) METHOD FOR SETTING INITIAL COMPENSATION VALUE IN SENSOR COMPLEX MODULE

(75) Inventors: Kyoung Soo Chae, Kyunggi-do (KR); Ghun Hahm, Seoul (KR); Hyun Joon Kim, Kyunggi-do (KR); Sung Whan Cho, Kyunggi-do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 20 days.

(21) Appl. No.: 11/617,883

(22) Filed: Dec. 29, 2006

(65) Prior Publication Data
US 2007/0193560 A1    Aug. 23, 2007

(30) Foreign Application Priority Data
Feb. 21, 2006    (KR) ............. 10-2006-0016850

(51) Int. Cl.
*D06F 33/02* (2006.01)

(52) U.S. Cl. ............................. 123/492; 702/86

(58) Field of Classification Search ............... 123/492, 123/488; 73/662, 514; 701/110, 115; 702/56, 702/86
See application file for complete search history.

(56) References Cited

U.S. PATENT DOCUMENTS

| 5,903,855 | A  | * | 5/1999 | Kiyota ...................... 702/86 |
| 6,023,978 | A  | * | 2/2000 | Dauenhauer et al. ......... 73/720 |
| 6,546,799 | B1 | * | 4/2003 | Vigna et al. .............. 73/514.01 |

* cited by examiner

*Primary Examiner*—Hieu T Vo
(74) *Attorney, Agent, or Firm*—Lowe Hauptman Ham & Berner

(57) ABSTRACT

A method for setting an initial compensation value of a sensor complex module, the method including the steps of: reading a preset sensitivity value and an offset; detecting an acceleration value; calculating an accelerating-force sensitivity value using the acceleration value and the offset value; calculating an accelerating-force error value using the accelerating-force sensitivity value and the sensitivity value; calculating a gradient error value using the accelerating-force error value and the acceleration of gravity; setting a polarity value according to the accelerating-force sensitivity value; and setting the accelerating-force error value, the gradient error value and the polarity as the initial compensation value.

7 Claims, 5 Drawing Sheets

METHOD FOR SETTING INITIAL COMPENSATION VALUE IN SENSOR COMPLEX MODULE

RELATED APPLICATION

The present application is based on, and claims priority from, Korean Application Number 2006-16850, filed Feb. 21, 2006, the disclosure of which is hereby incorporated by reference herein in its entirety.

BACKGROUND OF THE INVENTION

1. Field of the Invention

The present invention relates to a method for setting an initial compensation value of a sensor complex module applied to a mobile terminal such as a cellular phone, and more particularly, to a method for setting an initial compensation value of a sensor complex module, which can perform automatic and quick compensation for a gradient error. In the method, the sensor complex module having an acceleration sensor at a main board automatically and quickly measures the gradient error without using a separate measuring controller, thereby improving productivity and convenience in use.

2. Description of the Related Art

A mobile terminal such as a cellular phone provided with an inertial sensor has recently been released. The inertial sensor is packaged for an electrical connection between inside and outside. The inertial sensor is bonded with an electrode of a main board embedded in, for example, a cellular phone using various surface mounting techniques.

Here, the inertial sensor is a sensor used for an inertial navigation system, and measures acceleration and angular velocity and provides information of the acceleration and angular velocity to the system. The inertial sensor may be divided into an accelerometer and a gyroscope. Here, the accelerometer is a sensor that measures the acceleration of an object, and the gyroscope is a sensor that measures the angular velocity of a rotating object.

The inertial sensor is increasingly demanded in general fields including a navigation system of a vehicle, an Internet IV sensor, a shake compensator of a camcorder, besides the cellular phone. Also, the inertial sensor is expected to substitute for an exiting navigation sensor.

Also, the inertial sensor is bonded with a main board of a corresponding device, with a conductive material such as solder interposed therebetween. At the time of bonding, the bonding height may become uneven between right and left or between front and back because of physical influence. For this reason, the sensor is randomly inclined, causing an error in an output value. For example, the output value of the acceleration sensor may increase or decrease in proportion to a gradient, and in such a manner, a terrestrial magnetism sensor also makes an error in an output value.

To solve this problem, the conventional sensor complex module compensates an error by setting an initial compensation value by a method described in FIG. 1. This method will now be described with reference to FIG. 1.

FIG. 1 is a flow chart showing a method for setting an initial compensation value of a conventional sensor complex module. Referring to FIG. 1, the acceleration with respect to three axes (x, y and z) is sensed by using an acceleration sensor (S11), and a maximum value and a minimum value of the sensed acceleration with respect to the three axes are calculated (S12). Then, a sensitivity value is calculated using the maximum and minimum values by Equation 1 below (S13), and an offset value is calculated using the maximum and minimum values by Equation 2 below (S14). Then, the obtained sensitivity and offset values are stored in a memory.

$$\text{Sensitivity value} = \text{Maximum value} - \text{Minimum value} \quad \text{Equation 1}$$

$$\text{Offset value} = (\text{Maximum value} - \text{Minimum value}/2) = \text{Sensitivity value}/2 \quad \text{Equation 2}$$

BY using the sensitivity and the offset value stored and set in the aforementioned manner, the acceleration measured thereafter is compensated.

FIGS. 2(a), 2(b) and 2(c) are views exemplarily showing rotation of a main board for setting an initial compensation value of the conventional sensor complex module. Referring to FIGS. 2(a), 2(b) and 2(c), a separate maximum-minimum measuring unit is needed to set an initial compensation value of the conventional sensor complex module.

As illustrated in FIG. 2(a), a main board with the acceleration sensor is mounted to the maximum-minimum measuring unit. Then, to measure the maximum and minimum values of the acceleration with respect to the three axes, as illustrated in FIGS. 2(b) and 2(c), the maximum-minimum measuring unit to which the main board has been mounted is rotated to 90° with respect to each of the X and Y-axes from the location illustrated in FIG. 2(a), thereby detecting maximum and minimum values of the acceleration with respect to the X, Y and Z axes.

In the method for setting an initial compensation value of the conventional sensor complex module, an error generated by, for example, defective mounting is measured and compensated through such complicated processes using the maximum-minimum measuring device, which makes the error compensation complicated.

Also, an additional measuring movement of a product including therein an acceleration-sensor loaded main board is required, such as rotating or inclining in a certain direction. For this reason, the overload of a manufacturing line may occur, and thus productivity may be lowered.

SUMMARY OF THE INVENTION

Accordingly, the present invention is directed to a method for setting an initial compensation value in a sensor complex module that substantially obviates one or more problems due to limitations and disadvantages of the related art.

An object of the present invention is to provide a method for setting an initial compensation value of a sensor complex module, which can perform automatic and quick compensation for a gradient error by allowing the sensor complex module having an acceleration sensor at a main board to automatically and quickly measure the gradient error without using a separate measuring controller, so that productivity and convenience in use can be improved.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a method for setting an initial compensation value of a sensor complex module including an acceleration sensor, a memory and a controller that performs the setting of the initial compensation value. The method includes the steps of: reading a preset sensitivity value and an offset value from the memory; detecting an acceleration value using the acceleration sensor; calculating an accelerating-force sensitivity value using the acceleration value and the offset value; calculating an accelerating-force error value using the accelerating-force sensitivity value and the sensitivity value; calculating a gradient error value using the accelerating-force error value and the acceleration of gravity; setting a polarity value according to the accelerating-force sensitivity value; and storing the accelerating-force error value, the gradient error value and the polarity value in the memory, and setting the stored values as the initial compensation value.

The accelerating-force sensitivity value may be calculated by subtracting the offset value from the acceleration value.

The acceleration-force error value may be calculated by dividing the accelerating-force sensitivity value by the sensitivity value.

The gradient error may be calculated by dividing the accelerating-force error value by the acceleration of gravity and then performing an inverse sine ($sIN^{-1}$) transform.

The polarity value may be determined as a positive polarity when the accelerating-force sensitivity value is zero or greater, and the polarity is value may be determined as a negative polarity when the accelerating-force is smaller than zero.

The polarity value may be designated to '1' when the polarity is determined as the positive polarity, and the polarity value may be designated to '0' when the polarity is determined as the negative polarity.

The method for setting the initial compensation value of the sensor complex module may be used for a two or more axial acceleration sensor.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 3:
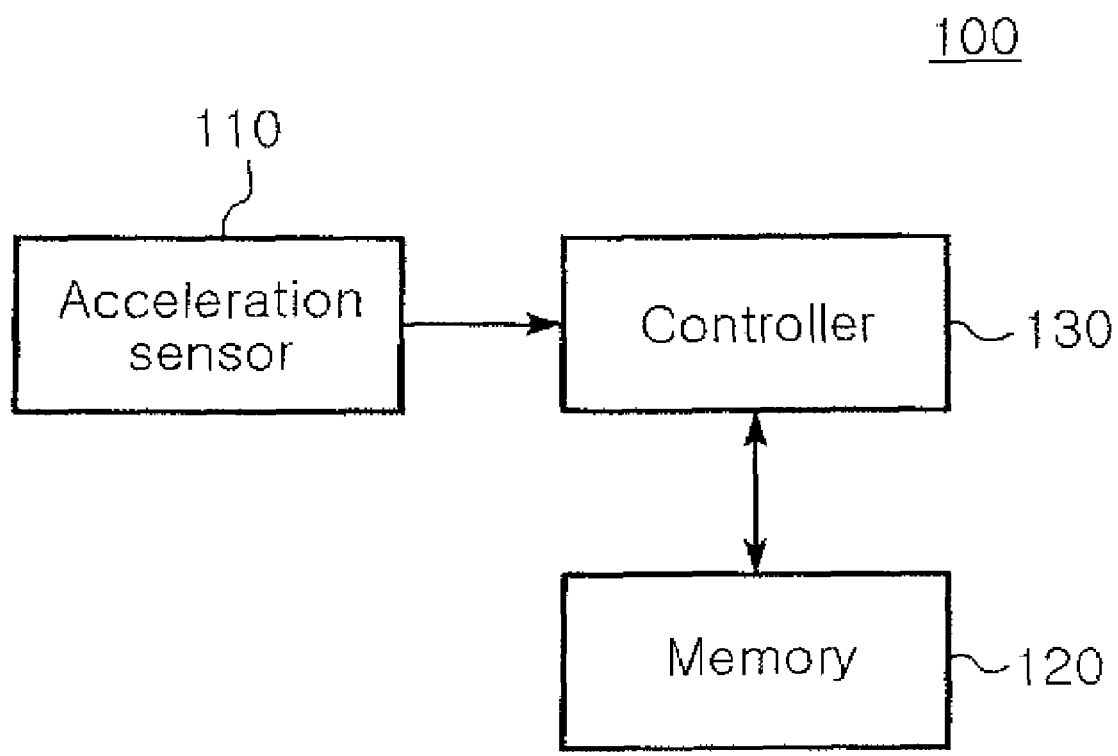
FIG. 3 is a block diagram of a sensor complex module according to the present invention.

FIG. 3 is a block diagram of a sensor complex module according to the present invention.

Referring to FIG. 3, a sensor complex module 100 according to the present invention includes an acceleration sensor 110, a memory 120, and a controller 130.

The acceleration sensor 110 measures the acceleration of a main board or a product mounted to a mobile terminal such as a cellular phone. Here, since the acceleration is proportional to shakes of the main board, the acceleration sensor 110 can measure shakes or movements of the corresponding mobile terminal. Here, the acceleration sensor 110 may be a two-axial acceleration sensor or a three-axial acceleration sensor.

The memory 120 stores a sensitivity value (V1) and an offset value (V2) preset according to the performance of the acceleration sensor, and stores an accelerating-force error value (Ve), a gradient error value (θe) and a polarity value (Vp) that are calculated thereafter.

The controller 130 reads the preset sensitivity value (V1) and the offset value (V2) from the memory 120, detects an acceleration value (V3) using the acceleration sensor 110, and calculates an accelerating-force sensitivity value (V4) by subtracting the offset value (V2) from the acceleration value (V3). The controller 130 obtains an accelerating-force error value (Ve), a gradient error value (θe) and a polarity value (Vp) using the accelerating-force sensitivity value (V4) and the sensitivity value (V1), stores the obtained values, and sets the stored values as initial compensation values.

Also, the controller 130 determines a polarity as a positive polarity when the accelerating-force sensitivity value (V4) is zero or greater, and determines the polarity as a negative polarity when the accelerating-force sensitivity value (V4) is smaller than zero.

In more detail, the controller 130 designates the polarity value (Vp) to '1' when the polarity is determined as the positive polarity, and designates the polarity value to '0' when the polarity is determined as the negative polarity.

Figure 4:
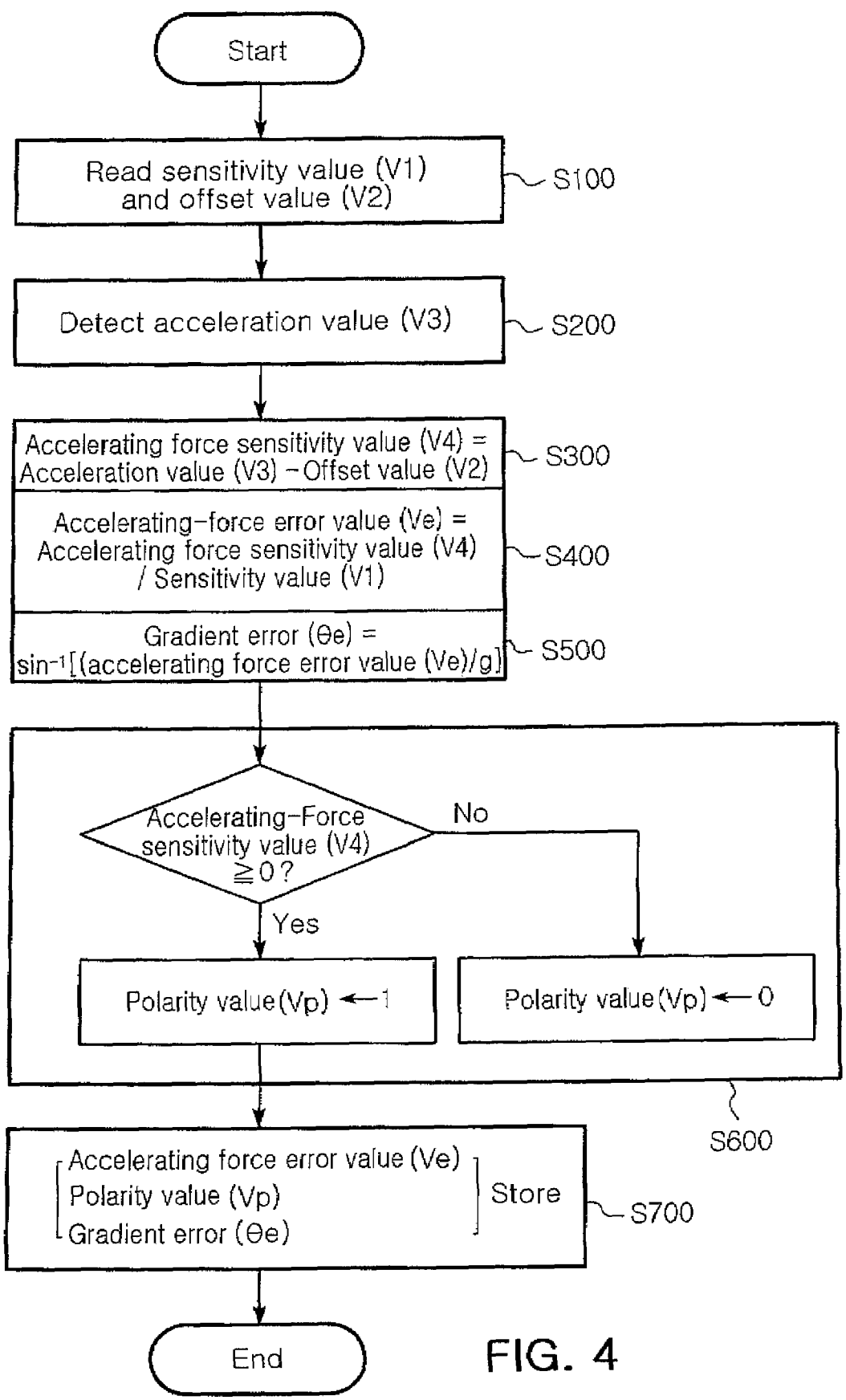
FIG. 4 is a flow chart showing a method for setting an initial compensation value of a sensor complex module according to the present invention.

FIG. 4 is a flow chat showing a method of setting initial compensation values of the sensor complex module according to the present invention. In FIG. 3, S100 is a step of reading the preset sensitivity value (V1) and the offset value (V2) from the memory 120. S200 is a step of detecting an acceleration value (V3) using the acceleration sensor 110. S300 is a step of calculating an accelerating-force sensitivity value (V4) by subtracting the offset value (V2) from the acceleration value (V3). S400 is a step of calculating an accelerating-force error value (Ve) by dividing the accelerating-force sensitivity value (V4) by the sensitivity value (V1). S500 is a step of obtaining a gradient error value (θe) by dividing the accelerating-force error value (Ve) by the acceleration of gravity and performing an inverse sine ($SIN^{-1}$) transform. S600 is a step of setting a polarity value (Vp) according to the accelerating-force sensitivity value (V4). S700 is a step of setting the accelerating-force error value (Ve), the gradient error value (θe) and the polarity value (Vp) as initial compensation values.

Figure 5:
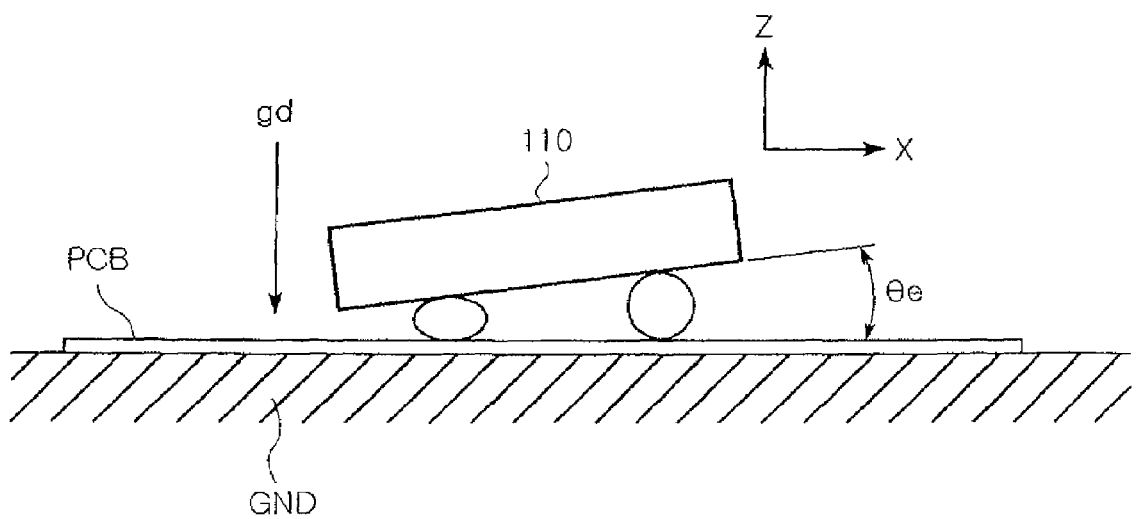
FIG. 5 is a view for describing a gradient error according to the present invention.

FIG. 5 is a view for describing a gradient error according to the present invention. In FIG. 5, GND denotes a ground, a printed circuit board (PCB) denotes a main board, a gd denotes a direction of the acceleration of gravity, 110 denotes an acceleration sensor, and θe denotes a gradient error between the main board and the acceleration sensor.

Operations and effects of the present invention will now be described in detail with reference to the accompanying drawings.

Figure 1:
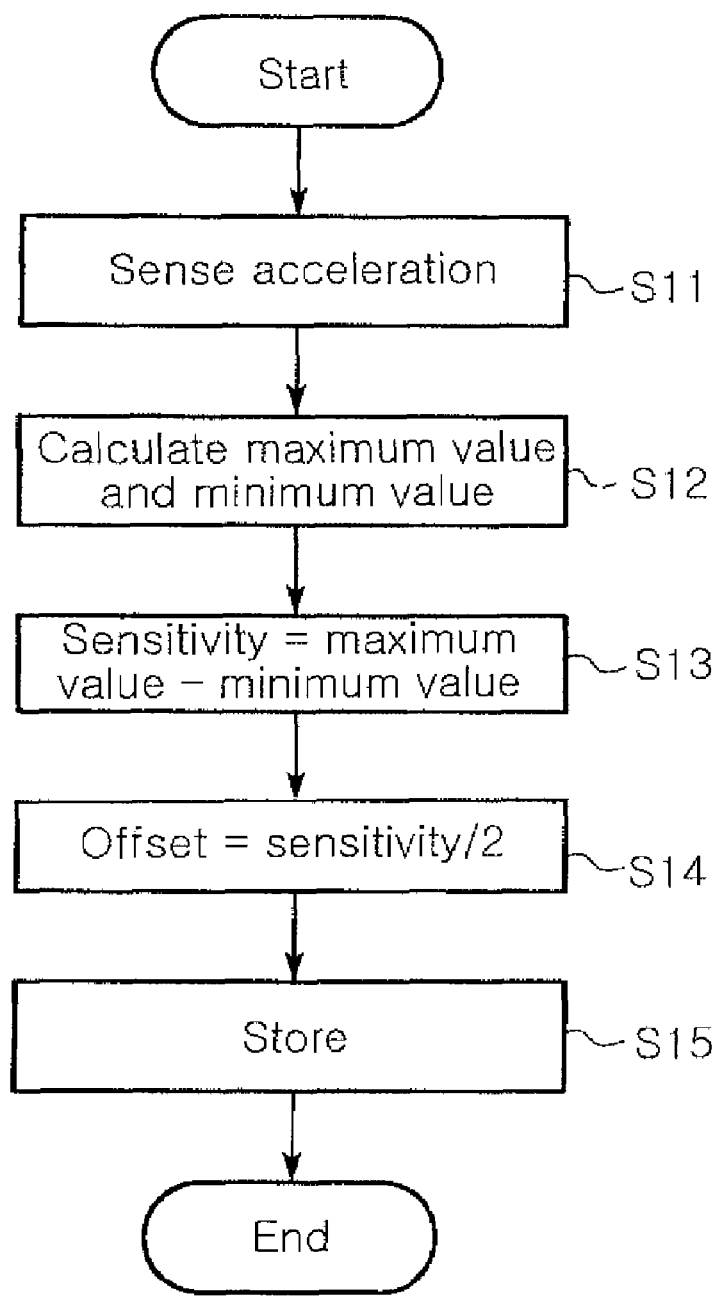
FIG. 1 is a flow chart showing a method for setting an initial compensation value of a conventional sensor complex module.
Figure 2:
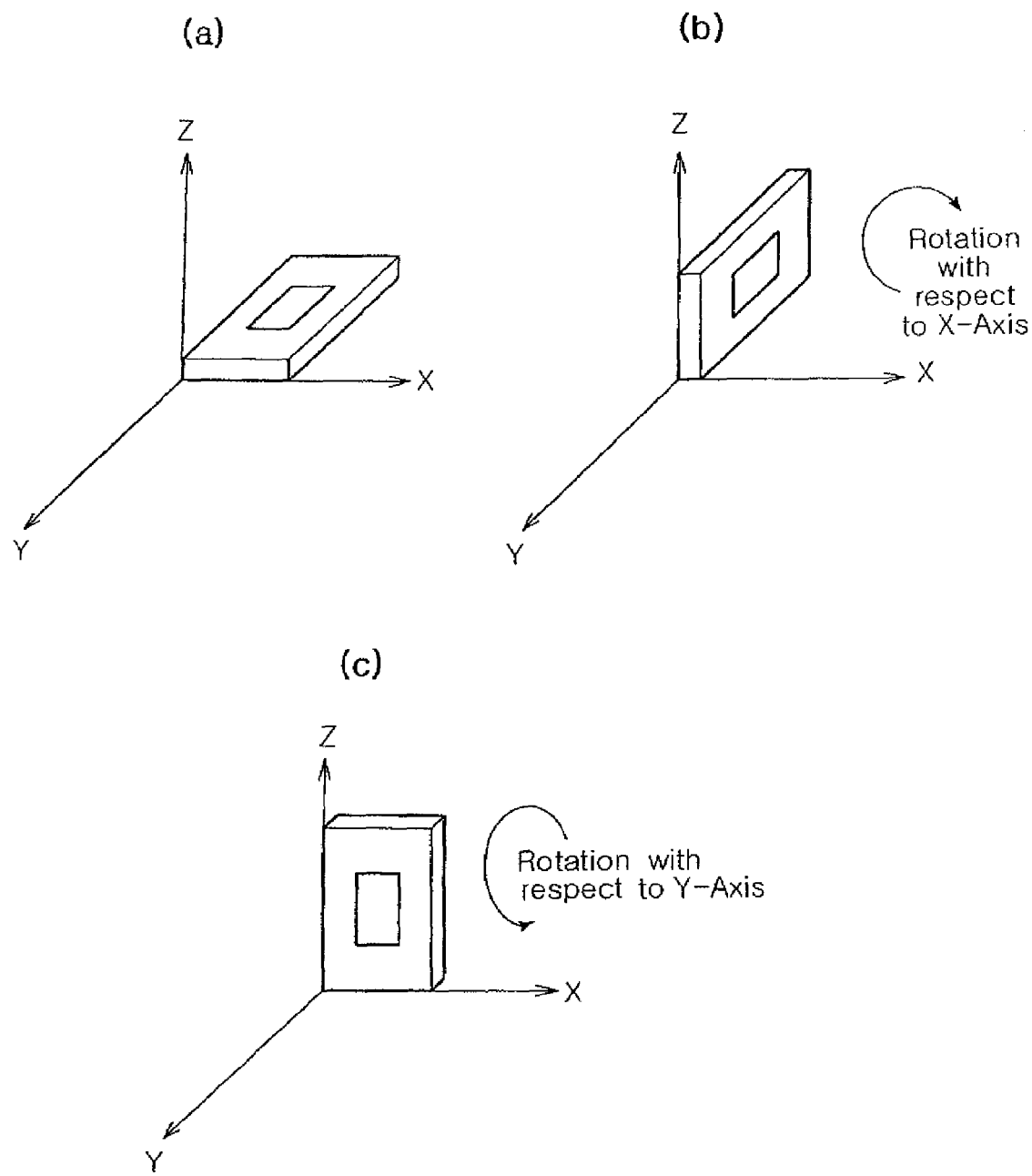
FIGS. 2(*a*), 2(*b*) and 2(*c*) are views exemplarily showing rotation of a main board for setting an initial compensation value of the conventional sensor complex module.

The sensor complex module 100 employing the method of setting initial compensation values according to the present invention may be loaded on a mobile terminal such as a cellular phone. As illustrated in FIG. 2, the sensor complex module 100 includes the acceleration sensor 110, the memory 120, and the controller 130.

Here, the controller 130 sets initial compensation values, using a preset sensitivity value (V1) and an offset value (V2) stored in the memory 120, and an acceleration value detected by the acceleration sensor 110. Here, the initial compensation values include an accelerating-force error value (Ve), a gradient error value (θe), and a polarity value (Vp).

This will now be described with reference to FIGS. 3 through 5.

Referring to FIGS. 3 through 5, the method for setting initial compensation value of the sensor complex module according to the present invention will be described. Referring to FIGS. 3 and 4, the controller 130 reads the preset sensitivity value (V1) and the offset value (V2) from the memory 120 (S100) The preset sensitivity value (V1) and the offset value (V2) are performance values of the acceleration sensor 110.

Then, the controller 130 recognizes an acceleration value (V3) detected by the acceleration sensor 110, and stores the acceleration value (V3) in the memory 120 (S200). Here, the acceleration value (V3) of the acceleration sensor 110 may be expressed by Equation 3 below.

Acceleration value (V3)=Sensitivity value×Physical change value (Acceleration error value)+Offset value  Equation 3

Then, the controller 130 calculates an accelerating force sensitivity value (V4), using the aforementioned acceleration value (V3) and the offset value (V2) read from the memory 120. Specifically, the offset value (V2) is subtracted from the acceleration value (V3), thereby obtaining the accelerating-force sensitivity value (V4) as shown in Equation 4 (S300).

Accelerating-force sensitivity value (V4)=Acceleration value (V3)−Offset value−Sensitivity value× Physical change value  Equation 4

Then, the controller 130 calculates an accelerating-force error value (Ve) using the sensitivity value (V1) and the accelerating-force sensitivity value (V4) shown in FIG. 4 Specifically, the accelerating-force sensitivity value (V4) obtained by Equation 4 is divided by the sensitivity value (V1), thereby obtaining the accelerating-force error value (Ve) as shown in Equation 5 below.

$$\text{Accelerating-force error value } (Ve) = \frac{\text{Accelerating force sensitivity value} (V4)}{\text{Sensitivity value}} = \frac{\text{Acceleration value} (V3) - \text{offset value}}{\text{sensitivity value}}$$

Equation 5

Then, the controller 130 obtains a gradient error value (θe) using the acceleration of gravity (g) and the accelerating-force error value (Ve) obtained by Equation 5. Specifically the accelerating-force error value (Ve) is divided by the acceleration of gravity (g), and an inverse sine (sin−1) transform is performed, thereby obtaining the gradient error value (θe) as shown in Equation 6 below (S500).

Accelerating-force error value (physical change value) (Ve)=g (Acceleration of gravity)×SIN(θe)

Gradient error (θe)=SIN$^{-1}$[(Accelerating-force error value (Ve))/g]  Equation 6

Then, the controller 130 sets a polarity value (Vp) according to the accelerating force sensitivity value (V4) as shown in FIG. 6 (S600). That is, in the step of setting the polarity value (S600), when the accelerating-force sensitivity value (V4) is zero or greater, the polarity is determined as a positive polarity; when smaller than zero, the polarity is determined as a negative polarity.

In more detail, in the step of setting the polarity value (S600), when the polarity is determined as the positive polarity, the polarity value (Vp) is designated to '1'; when determined as the negative polarity, the polarity value (Vp) is designated to '0'.

Thereafter, the controller 130 sets the accelerating-force error value (Ve), the gradient value (θe), the polarity value (Vp) obtained by the aforementioned steps as the initial compensation values (S700).

Thus, the mobile terminal or the like that employs the method according to the present invention compensates sensor output values, using the accelerating-force error value (Ve), the gradient error value (θe) and the polarity value (Vp) obtained through the aforementioned steps.

According to the present invention, in the method for setting the initial compensation values of the sensor complex module applied to a mobile terminal such as a cellular phone, the accelerating sense is mounted to a main board of the sensor complex module to implement automatic and quick measuring of a gradient error without using any special measuring unit. Accordingly, compensation of the gradient error can be automatically performed, and productivity and convenience in use can be improved.

That is, an acceleration sensor that receives inputs of external physical influence is greatly affected by the gradient error generated by mounting of the main board. Removing or minimizing the gradient error is a main technical object. The present invention allows measuring of the gradient error to be performed without any additional operations, so that a load does not occur during a manufacturing process, and convenience of a user can be maximized.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for setting an initial compensation value of a sensor complex module having an acceleration sensor, a memory, and a controller performing the setting of the initial compensation value, the method comprising the steps of:
    reading a preset sensitivity value and an offset value from the memory;
    detecting an acceleration value using the acceleration sensor;
    calculating an accelerating-force sensitivity value using the acceleration value and the offset value;
    calculating an accelerating-force error value using the accelerating-force sensitivity value and the sensitivity value;
    calculating a gradient error value using the accelerating-force error value and the acceleration of gravity;
    setting a polarity value according to the accelerating-force sensitivity value; and
    storing the accelerating-force error value, the gradient error value and the polarity value in the memory, and setting the stored values as the initial compensation value.

2. The method of claim 1, wherein the accelerating-force sensitivity value is calculated by subtracting the offset value from the acceleration value.

3. The method of claim 1, wherein the acceleration-force error value is calculated by dividing the accelerating-force sensitivity value by the sensitivity value.

4. The method of claim 1, wherein the gradient error is calculated by dividing the accelerating-force error value by the acceleration of gravity and then performing an inverse sine ($SIN^{-1}$) transform.

5. The method of claim 1, wherein the polarity value is determined as a positive polarity when the accelerating-force sensitivity value is zero or greater, and the polarity is value is determined as a negative polarity when the accelerating-force is smaller than zero.

6. The method of claim 5, wherein the polarity value is designated to '1' when the polarity is determined as the positive polarity, and the polarity value is designated to '0' when the polarity is determined as the negative polarity.

7. The method of claim 1, wherein the acceleration sensor is a two or more axial acceleration sensor.

* * * * *